United States Patent
Mohr (10) Patent No.: US 7,630,322 B2
(45) Date of Patent: Dec. 8, 2009

(54) OSPF MONITOR

(75) Inventor: Thomas Mohr, Tamm (DE)

(73) Assignee: Alcatel, Paris (FR)

( * ) Notice: Subject to any disclaimer, the term of this patent is extended or adjusted under 35 U.S.C. 154(b) by 666 days.

(21) Appl. No.: 10/785,098

(22) Filed: Feb. 25, 2004

(65) Prior Publication Data

US 2004/0190457 A1 Sep. 30, 2004

(30) Foreign Application Priority Data

Mar. 24, 2003 (EP) .................................. 03290742

(51) Int. Cl.
*H04L 12/28* (2006.01)
(52) U.S. Cl. ...................................... 370/252; 370/254
(58) Field of Classification Search ................. 370/229, 370/235, 236, 241, 250, 252, 254, 255
See application file for complete search history.

(56) References Cited

U.S. PATENT DOCUMENTS

| 5,917,808 | A | 6/1999 | Kosbab | |
|---|---|---|---|---|
| 5,926,463 | A | 7/1999 | Ahearn et al. | |
| 6,751,660 | B1 * | 6/2004 | Mansingh et al. | 709/223 |
| 7,043,633 | B1 * | 5/2006 | Fink et al. | 713/162 |
| 7,126,941 | B1 * | 10/2006 | Clemm et al. | 370/352 |
| 2002/0156914 | A1 | 10/2002 | Lo et al. | |
| 2002/0186664 | A1 * | 12/2002 | Gibson et al. | 370/254 |
| 2003/0043820 | A1 * | 3/2003 | Goringe et al. | 370/400 |
| 2003/0156552 | A1 * | 8/2003 | Banker et al. | 370/266 |
| 2003/0204509 | A1 * | 10/2003 | Dinker et al. | 707/100 |

FOREIGN PATENT DOCUMENTS

| GB | 2 362 062 A | 11/2001 |
|---|---|---|
| WO | WO 90/14725 A1 | 11/1990 |
| WO | WO 00/05650 A1 | 2/2000 |

OTHER PUBLICATIONS

Epstein H et al: "Managing Optical Networks" Bell Labs Technology, Bell Laboratories, Murrey Hill, NJ, US, vol. 6 No. 1, Jan. 2001, pp. 50-66, XP001099878.

* cited by examiner

*Primary Examiner*—Brian D Nguyen
(74) *Attorney, Agent, or Firm*—Sughrue Mion, PLLC (57) ABSTRACT

A network monitor monitors traffic on a dedicated data network passively. The data network connects network controllers which control associated network elements of an automatically switched optical transport network. The network controllers regularly advertise their locally stored network topology and status information using a predefined protocol. The monitor filters protocol frames of this predefined protocol type and extracts therefrom information about the topology and status of the transport network and displays these information graphically to a user.

8 Claims, 3 Drawing Sheets

OSPF MONITOR

The invention is based on a priority application EP 03290742.0 which is hereby incorporated by reference.

FIELD OF THE INVENTION

The present invention relates to the field of telecommunications and more particularly to a device for displaying the topology and status of an automatically switched optical transport network (ASON).

BACKGROUND OF THE INVENTION

Transport networks serve for the physical layer transport of high bitrate tributary signals. In particular, the signals transmitted over a transport network are encoded and multiplexed into a continuous bit stream structured into frames of the same length. Within this constant bitrate bit stream, the frames are repeated periodically with a frame repetition rate of typically 8 kHz and are structured according to a multiplexing hierarchy. An example of such a multiplexing hierarchy is SDH (Synchronous Digital Hierarchy, see ITU-T G.707 10/2000) where the frames are termed synchronous transport modules of size N (STM-N, where N=1, 4, 16, 64, or 256). The frames have a section overhead and contain at least one higher order multiplexing unit called virtual container VC-4. A VC-4 can either directly carry a tributary signal or a number of lower order multiplexing units like VC-12 or VC-3, which then carry tributary signals.

Virtual containers are transmitted from source to sink through an SDH network and therefore represent a "logical" path through the network. The sequence of identical VCs having the same position in subsequent frames forms a traffic stream along that path. Each VC contains a path overhead (POH) and a payload section referred to as container (C). The US equivalent of SDH is known as SONET (Synchronous Optical Network). Another well known transport network with similar multiplexing units is the recently defined Optical Transport Network OTN; see ITU-T G.709, 02/2001.

The transport network itself consists of a number of physically interconnected network elements such as crossconnects and add/drop multiplexers. Traditional transport networks are managed centrally. This means that a central network manager has the overview about the topology and status of the network and if a customer desires a new connection for a tributary signal, the network operator manually establishes via his network management system a corresponding path through the transport network. Thus, paths through a centrally managed network are created under the control of the central network management system, which instructs all affected network elements (potentially using intermediate lower level network management facilities) to switch corresponding crossconnections to establish the new path.

In label switched packet networks, as opposed to transport networks, paths, which are referred to as label switched paths (LSPs) in this context, are created automatically using MPLS (Multi-Protocol Label Switching) signaling. Network devices in such packet switched networks use routing protocols such as OSPF and BGP to update and synchronize their local routing information. The fundamental difference between transport networks and packet networks where MPLS applies is, that in packet networks statistical multiplexing is used allowing over-subscription of links and that an LSP can be established without using any bandwidth. However, in transport networks, if a path is established, then by definition the full bandwidth requested by the path is consumed, independent of whether traffic is transmitted over this path or not. An LSP can be established in MPLS but not used, whereas this is not possible in transport networks. Due to the dynamic and inconstant data rate in a packet network, the number and bandwidth of LSPs does not necessarily correlate with the idle capacity of the physical link over which the LSPs lead.

However, the obvious advantages of label switched packet networks in terms of flexibility and failure resistance have lead to the development of automatically switched optical transport networks (ASONs). This development has culminated in the definition of a new signaling protocol for optical networks which is known as GMPLS (Generalized Multi-Protocol Label Switching). The underlying principle is that each network element has its own GMPLS controller. The GMPLS controllers in the network communicate over a dedicated Ethernet data network with each other to coordinate a path set-up and configure their corresponding network elements accordingly to automatically establish a dynamically agreed paths. Each GMPLS controller must therefore have a complete knowledge of the topology and status of the entire transport network. An OSPF protocol (Open Shortest Path First), extended to the particular needs of a GMPLS-controlled transport network, is used to communicate (or "advertise") the status of the transport network from one GMPLS controller to the other. Each controller has a database where it stores the topology data of the network according to its latest knowledge.

Since in a GMPLS-controlled transport network, the network management or control plane, as it is referred to in this context, is distributed among the entire network, the network operator has no central tool anymore that might give him an overview over his network. It would be possible to link a presentation tool to the GMPLS controller of an arbitrary network element and display the local topology and status information stored by this particular network element to the operator. However, the local database contents, as it relates to the device of a particular equipment vendor, is interspersed with vendor-specific extras. Moreover, the operator would have to rely on the proper functioning of this particular implementation of the database and it would not be possible to check the database contents against the databases of other GMPLS controllers in the network.

A need exists therefore for an independent device for determining and displaying the topology and status of an automatically switched optical transport network.

From U.S. Pat. No. 5,926,463, an apparatus for viewing and managing a configuration of a computer network is known. The apparatus polls a plurality of switches and routers present in a packet switched network to obtain copies of information stored in databases on the switches and routers. It determines from this combined database the status of the network and displays physical connectivity and status of the network graphically to the user. This tool is, however, suited for packet networks only, and requires a vendor-independent definition of the database structure stored in each network device. Moreover, a protocol for the polling mechanism is required, which is, however, not foreseen in GMPLS networks.

From U.S. Pat. No. 5,917,808 a test instrument for testing local area networks (LANs) is known, which uses passive monitoring and allows to identify network device types on a LAN operating according to the TCP/IP protocol suite. The test instrument, when coupled to the LAN, passively receives traffic in the form of frames that are being sent between the nodes on the LAN. The frames being sent may contain information that may be uniquely associated with specific types of network devices such as servers, routers, or printers. A frame processor collects and extracts the frame information from the frames, including the message type and source IP address. The frame information is compared against sets of frame types, with each set of frame types uniquely associated with one of the network device types. The device types as detected are added to a station database and displayed graphically to a user. This instrument, however, does not seem to be of any use in an automatically switched optical transport network of the type described above.

It is therefore an object of the present invention to provide a device and corresponding method for determining and displaying the topology and status of an automatically switched optical transport network.

SUMMARY OF THE INVENTION

These and other objects that appear below are achieved by a network monitor that passively monitors traffic on a dedicated data network connecting network controllers each controlling an associated network element of an automatically switched optical transport network. The monitor filters protocol frames of a predefined protocol type, which advertise the network topology and status between the network controllers. From the filtered protocol frames, the monitor extracts information about the topology and status of the transport network and displays these information graphically to a user.

The invention has the advantage that it functions in a non-intrusive manner and provides a vendor-independent implementation, i.e., that it will function in any GMPLS-controlled transport network irrespective of the vendor types of the used network equipment. Moreover, the invention allows a network operator troubleshooting and failure debugging in his network when equipment from different vendors does not cooperate properly. Finally, the monitor according to the invention can be extended by a command line interface to one or more of the network controllers so as to allow central connection provisioning.

BRIEF DESCRIPTION OF THE DRAWINGS

A preferred embodiment of the present invention will now be described with reference to the accompanying drawings in which.

DETAILED DESCRIPTION OF THE INVENTION

Figure 1:
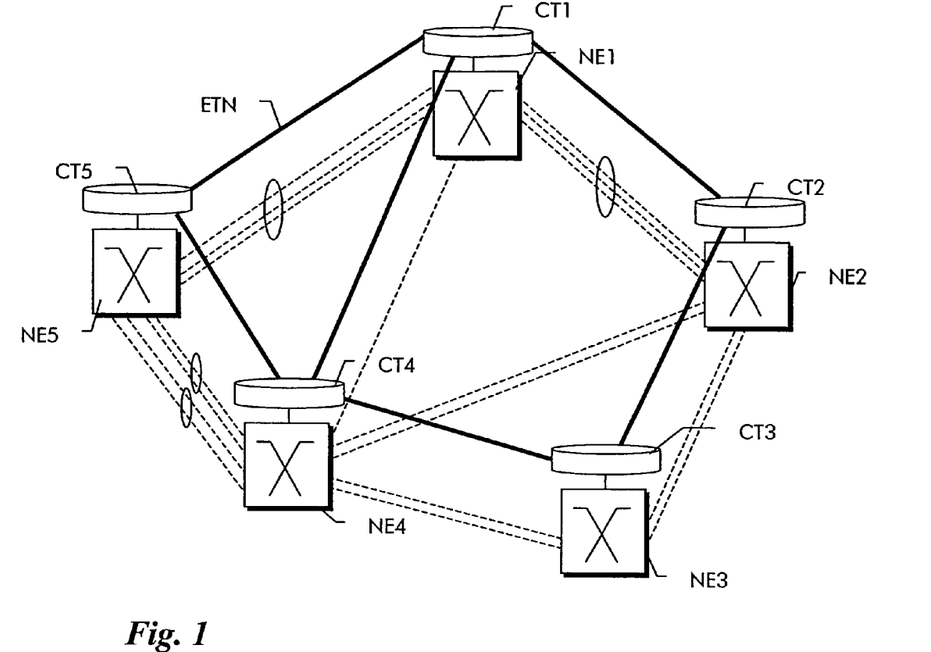
FIG. 1 shows an automatically switched optical transport network and its associated distributed control plane.

The above explained principle of a GMPLS-controlled transport network will be described in more detail with reference to FIG. 1, which shows an example network composed of five network elements NE1-NE5, which are physically connected with each other using one or more optical fiber links. Each optical fiber link is shown as a dotted line. Fibers may also be bundled, which is indicated by circles around fibers belonging to the same bundle of fibers. For example NE1 is connected to NE2 to NE2 by three fibers forming a single bundle and to NE3 via three fibers forming one bundle and to NE4 via a single fiber. NE2 is additionally connected to NE3 and NE4 via two fibers, each, NE3 is connected to NE4 via two fibers, and NE5 is connected to NE4 via four fibers arranged in two bundles.

Depending on the type of fiber used and the interfaces of the network elements connecting to the fibers, each fiber can carry one STM-N signal of a certain type. For the sake of simplicity but without loss of generality, it is assumed that each fiber carries an STM-16 signal, i.e., a framed transmission signal with a capacity of 16 multiplexing units VC-4. A path through the transmission network is represented by a particular VC-4. For instance, NE5 can creates a VC-4 destined for a user connected to NE2. NE4 and NE3 switch this particular VC-4 through unchanged, so that the VC-4 reaches NE2 via NE4 and NE3. A path exists thus between NE5 and NE2 leading over NE4 and NE3. Obviously, many alternative routes through the example network would exists for an alternate path between NE5 and NE2. The event of switching a VC-4 unchanged from input to output in NE4 or NE3 is referred to as a crossconnection. Instead of the term path, one speaks also about a logical connection or only about a connection in this context.

In a transport network, such paths or connections are semi-permanent, which means that these are not created only temporarily for the duration of a single telephone call or only for the duration of a single packet such as in packet switched networks, but exist for a certain period of time and remain valid for all subsequent multiplexing units belonging to the same traffic stream until such path is actively removed again.

Path set-up is achieved in transport networks through the control plane of the network. In traditional centrally managed networks, the control plane is implemented into a central management system while in a GMPLS-controlled network, the control plane is distributed across the network. The latter is shown in FIG. 1. Each network element NE1-NE5 is assigned a GMPLS controller CT1-CT5. The controllers are interconnected by a dedicated packet switched data network, i.e., an Ethernet ETN shown as bold lines between the controllers in FIG. 1. The Ethernet ETN is independent of the underlying transport network. Some connections in the Ethernet may use the data communication channel (DCC) available for this purpose in the overhead of transmission signals on the transport network. However, some other connections may lead via dedicated copper wires between the controllers. The topology of the Ethernet may be the same, as shown in the figure, or similar as the topology of the transport network but may also be totally different. It should be understood, however, that the data network used to control the transport network is completely independent of the latter in the sense that changes in the configuration of the transport network by the control plane would not affect the data network at all.

Each controller has knowledge about the topology and status (e.g., the available bandwidth of each link) of the network, which information is stored in a local database of the respective controller. In order to establish the path of the example above, controller CT5 assigned to network element NE5 determines from its database an idle route via NE4 and NE3 to NE2 and sends appropriate GMPLS requests via the Ethernet ETN to the corresponding controllers CT4, CT3, and CT2 to switch local crossconnections for the path to be established.

Figure 2A:
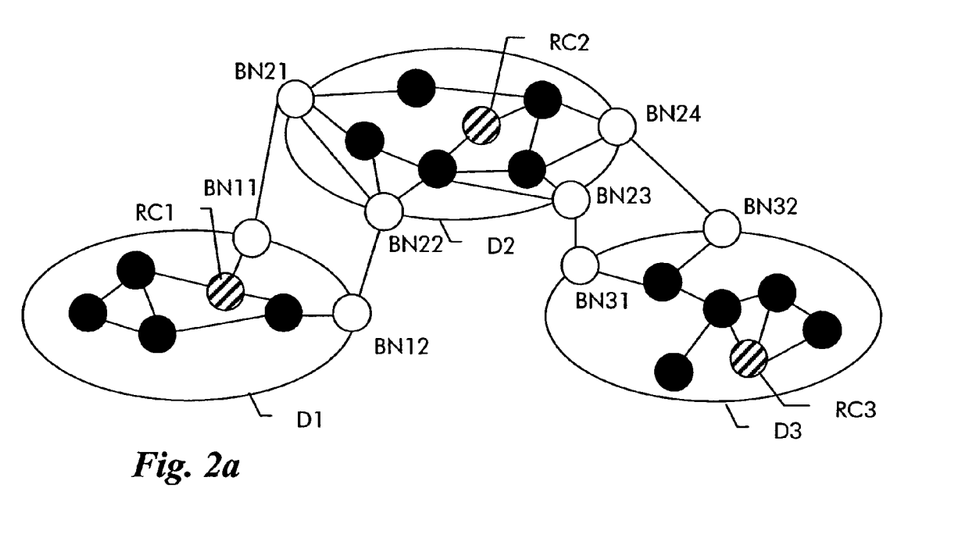
FIGS. 2a and b show the topology of an automatically switched optical transport network comprising several domains and an abstraction of the topology as it is advertised throughout the network.

FIG. 2a shows an example of a network topology. The network contains three domains D1-D3. A domain is a group of nodes, which are grouped together more or less arbitrarily. Typically, a domain is composed of network nodes from the same vendor. Network nodes within these domains are symbolized as circles. There are internal nodes shown as black circles, i.e., those nodes which have no connections to outside the corresponding domain, and there are border nodes shown as blank circles, i.e., those nodes, which have connections to outside the domain. In addition, each domain has a routing controller RC1-RC3, i.e., the network controller of a selected network node in the domain that acts as management agent for the managed domain. Routing controllers are shown by hashed circles.

Each network node has an IP address via which it can be reached by other network nodes (or exactly by the network controllers of these other network nodes) in the control network. This is the NNI controller address. Moreover, each I/O interface of each network node is assigned an own address that is referred to as the TNA address.

The purpose of the routing controller is to abstract the internal topology of its domain and communicate the abstracted structure to the routing controllers of the other domains. In particular, the routing controllers communicate the inter-domain links and the TNA addresses that are reachable through border nodes of the domain. The process of communication the topology and status information is also referred to as "advertising", which is why the routing controllers are sometimes also referred to as advertising controllers.

It should be understood that inter-domain communication takes place only between the routing controllers while the communication between the routing controller and the network nodes from the domain it manages uses proprietary mechanisms. It should be further noted that more than one routing controllers are allowed per domain but with the restriction that between any two domains there is at most a single pair of adjacent controllers, which communicate with each other. In other words, if there are more than one routing controllers in a domain, it must be assured that there is an unambiguous assignment of routing controllers to external domains so that each external domain communicates with only one of the routing controllers.

Figure 2B:
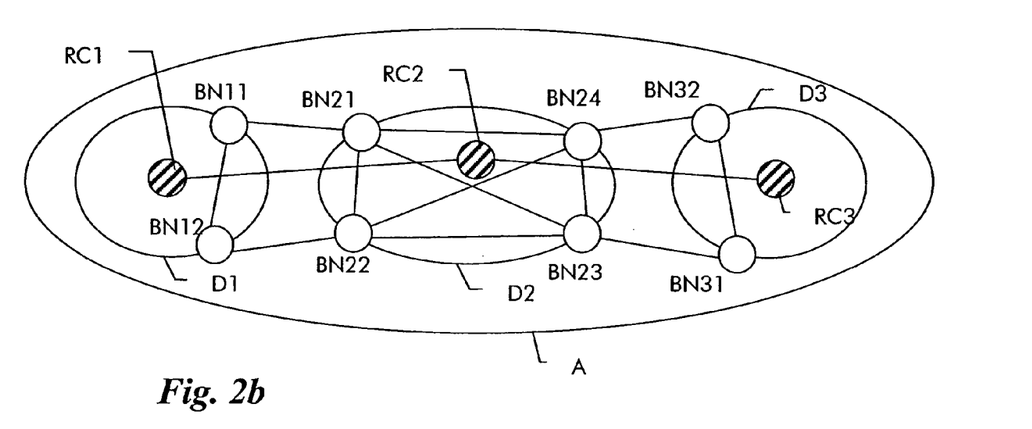

The abstraction of the network as it is advertised by the routing controllers is shown in FIG. 2b. Each domain is identified by its routing controller. The abstraction includes the address of the routing controllers, the border nodes and links to and from the border nodes. The "picture" an adjacent node thus has from the network is the one depicted in FIG. 2b. In particular, domain D1 has in this abstraction a routing controller RC1 and two border nodes BN11, BN12, domain D2 has a routing controller RC2 and four border nodes BN21-BN24, and domain D3 contains a routing controller RC3 and two border nodes BN31, BN32. The abstraction certainly contains the inter-domain links, which are in particular: BN11 is connected to BN21, BN12 is connected to BN22, BN24 is connected to BN32, and BN23 is connected to BN31. Moreover, the abstraction contains domain-internal connections but which may lead, however, via non advertised internal nodes. In this abstractions, BN11 is connected to BN12, BN21 is connected to BN22 and to BN24, BN22 is further connected to BN24 and to BN23, BN23 is further connected to BN24, and BN32 is connected to BN31. The entire network is referred to as an area A.

As explained in the opening part of this specification, the controllers need to update their local databases from time to time so that all controllers have the same topology and status information. This is achieved though the use of a dedicated protocol, which is the OSPF (Open Shortest Path First) protocol but in a slightly modified version adopted to the particular needs of a transport network. This is in contrast to packet networks, where inter-domain communication uses BGP (Border Gateway Protocol).

Regular updates occur every 30 min, which means that each routing controller sends every 30 min its complete topology and status information to all other routing controllers. Whenever a new routing controller is connected to the data network, or when for example a routing controller re-boots after a system crash, it sends a request to all other routing controllers for an immediate update. Moreover, each change due to for instance a new connection is advertised separately.

A basic idea of the invention is to passively monitor the traffic on the control network and filter the traffic for OSPF frames. Only such OSPF frames are evaluated to determine current network topology and status information to be displayed to a user. Monitoring is thus non-intrusive, as it does not affect communication on the control network. Moreover, no own IP address is required for the monitor, which may conflict with other already assigned IP addresses and no communication protocol between monitor and network controllers is required.

Figure 3:
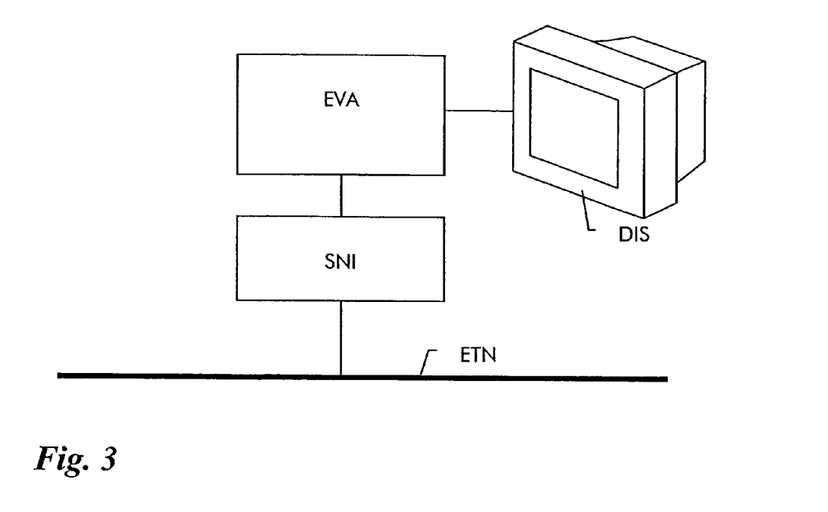
FIG. 3 shows the architecture of the monitor according to the invention.

A non-intrusive monitor according to the invention is shown schematically in FIG. 3. The monitor is a computer with network interface that simply connects to the Ethernet ETN. In the preferred embodiment, the computer is a UNIX machine. It contains a sniffer module SNI, i.e., a tool that can capture packets off the network and analyze them. The sniffer is a protocol analyzer that allows to examine data from a live network. Data can be captured "off the wire" from a live network connection, or read from a previously capture file. In the particular embodiment, the monitor uses as its sniffer module a freely-available tool known under the name "Ethereal". However, any other sniffer would also be appropriate.

The sniffer searches for OSPF frames on the Ethernet and sends those frames in ASCI format to the evaluation module EVA. The evaluation module performs the actual evaluation by extracting the relevant information from the various OSPF frames and send them to a graphical window on a display DIS. In the preferred embodiment, the evaluation module is a computer program written in Perl/Tk that when interpreted and executed on the computer performs the process of information extraction and displaying as will be described in the following. An example of a complete OSPF frame as it is received from the sniffer in ASCII code is attached as annex to this specification. The first 29 lines thereof contain the IP header while the remainder is the actual OSPF frame.

First of all, the evaluation module EVA searches for the statement "advertising router". For each advertising router, the evaluation module creates a domain represented by a circle. The advertising router advertises all border nodes of the domain as "MPLS/TE Local Node". The border nodes are thus represented in the corresponding domain. The interfaces are then determined from the interface index statement and displayed in the corresponding node. The relevant statements in the OSPF frame for these steps are the following:

Advertising Router: 10.0.4.1 (10.0.4.1)
MPLS/TE Local Node Index: 10.0.4.4 (10.0.4.4)
MPLS/TE Local Interface Index: 5001

The evaluation module determines then the TNA addresses from the following statement:

| TNA Node ID | MPLS/TE TNA Node ID: 10.0.4.2 (10.0.4.2) |
|---|---|
| TNA Address | MPLS/TE TNA TNA Addr: 2.2.14.42 (2.2.14.42) |

The topology is derived from the Remote Interface Index Information:

| | |
|---|---|
| Remote Node ID | MPLS/TE Remote Node Index: 10.0.4.1 (10.0.4.1) |
| Remote Interface ID | MPLS/TE Remote Interface Index: 5000 |

The evaluation module draws then for each link a line in the graphical representation. The statement "Link Switching Capability Descriptor" contains the information how many capacity would be available on the corresponding link. This statement mentions all available options:

| Link Switching Capability Descriptor |
|---|
| TLV Type: 32775: Link Switching Capability Descriptor |
| TLV Length: 20 |
| Switching Capability (100 TDM): 100 |
| Encoding (5 for Sonet/SDH): 5 |
| Signal Type: STS-48c/VC-4-16c |
| Number of Unallocated Timeslots: 1 |
| Signal Type: STS-12c/VC-4-4c |
| Number of Unallocated Timeslots: 4 |
| Signal Type: STS-3c SPE/VC-4 |
| Number of Unallocated Timeslots: 16 |
| Signal Type: STS-1 SPE/VC-3 |
| Number of Unallocated Timeslots: 48 |

In this example statement, up to 16 VC-4 would be available. For links with no available capacity the statement would contain Timeslots=0. The OSPF monitor of the preferred embodiment looks for this Timeslots=0 statement and shows such busy links in another color than links with idle capacity.

Figure 4:
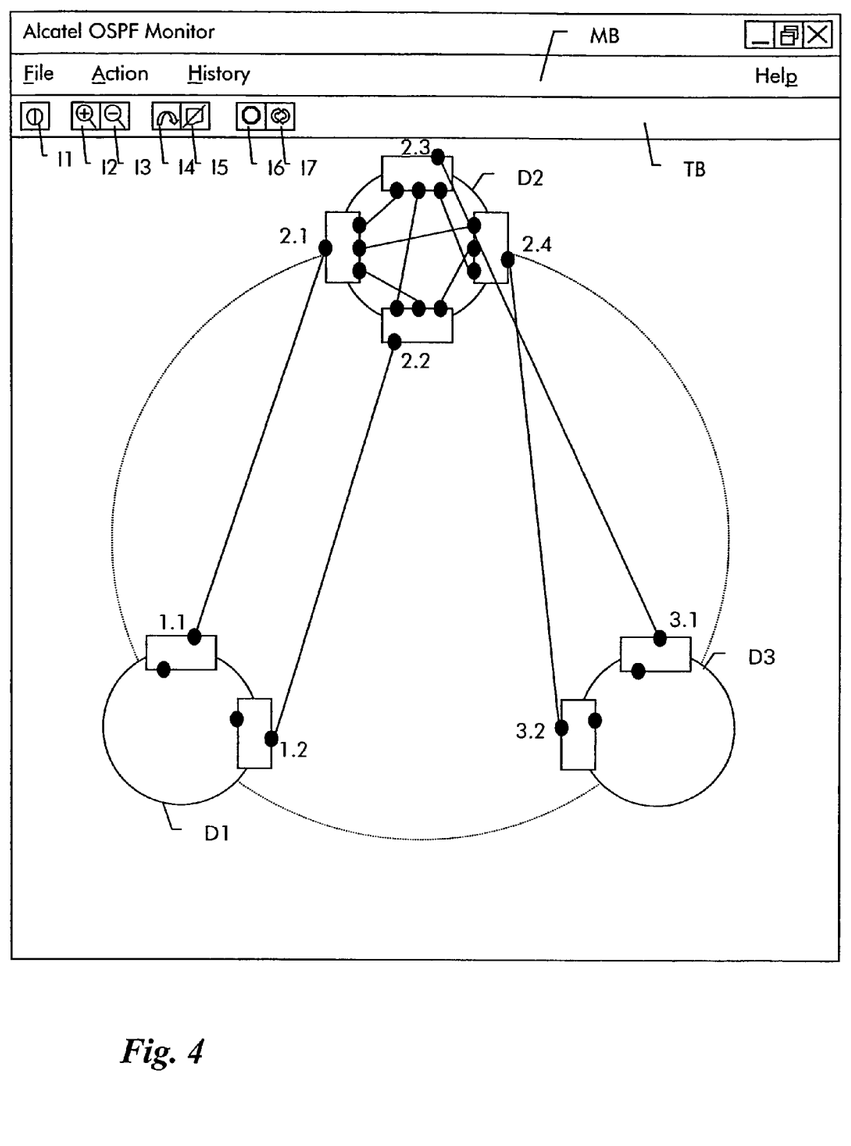
FIG. 4 shows a screenshot of the graphical presentation of the network topology and status by the monitor.

The final result for the area network A of FIG. 2b is shown as a screenshot of the monitor tool in FIG. 4.

The tree domains D1-D3 as identified by their advertising routers are displayed as circled D1-D3. These domain circles are arranged on a large circle if no coordinates are specified in a config file by the operator. The border nodes are displayed as rectangles and are placed on the circle line of their associated domain circle and identified by the corresponding node address as specified by the Local Node Index. Interfaces as specified by the Interface Index statement are displayed as bold dots in the border node rectangles and connection lines as specified by the Remote Interface Index statement are shown as lines interconnecting the related interface dots. Idle links are shown in green while busy links are shown in red. TAN addresses of the links are displayed only when the user moves with the mouse pointer to the corresponding link.

The program version of the preferred embodiment has in addition the following features available: In the tool bar TB there are seven icons I1-I7. Icon I1 serves to leave the application. Icons I2 and I3 serve to zoom the graphical representation of the network in (I2) or out (I3). Icon I4 serves to draw the representation again (re-draw). Icon I5 serves to delete the history, i.e., to start monitoring from the scratch again. Icon I6 serves to stop capturing and thus freezes the window to the current state. Icon I7 is the auto-update function, which will be used to draw all links at once. This is because in large networks, it might be very confusing to have all links displayed at once, so that links are drawn on the screen only when the user moves with the mouse to one of the terminating interfaces. However, in smaller networks or for a print-out, the user may want to hove all links shown at once as in FIG. 4, which is achieved through checking button I7. The menu bar MB contains the menu entries "File", "Action", "History", and "Help". In the menu "File", the user will find the additional functions to save the graphics or to save the frame history. Other menu entries allow for example to search for particular OSPF frame, which is particularly useful if the tool detects an configuration mismatch.

In a preferred modification, the monitor is further equipped with a command line interface to be connected to a particular network controller. As explained above, ordinary update messages are sent every 30 min. In the worst case, the monitor would thus have to wait for full 30 min until it receives update OSPF messages, which might be somehow disappointing to a user. Thus, the command line interface may be used to program the connected network controller to broadcast an appropriate OSPF request for an immediate update. Moreover, the command line interface may be used to program the network controller to set up a new connection or perform any other change in network configuration. It is particularly advantageous to do these extensions via a command line interface because it would not require any modifications to the existing network controller and on the other hand would not require that the monitor itself becomes active on the control network (which would require as discussed above an own address and associated protocol).

It should further be noted that the monitor as well as the network controllers are mainly implemented in software and that it would therefore be naturally possible to run the network controller on the same computer as one of the network controllers, using a multi-tasking operating system like UNIX for example. Moreover it would be possible to re-direct the graphical output to any remote terminal in the network, for instance using X-WINDOWS under UNIX.

Although having described a preferred embodiment of the invention, those skilled in the art would appreciate that various changes, alterations, and substitutions can be made without departing from the spirit and concepts of the present invention.

For example, it has been explained above that links with idle capacity are shown in a different color as busy links. This color coding can be further improved by using a scale of colors from for instance green for completely idle over yellow for half of the capacity remaining to red for busy links. It should be noted in this context that such color coding is specific to ASONs and would not make any sense in packet switched networks where capacity usage changes much to fast to use color coding.

In another extension, the monitor tool can be programmed to allow a use to configure the geographical coordinates of the domains so that the domains would no longer appear to be located along a large circle but would be shown in some geographical neighborhood. Here, it could be further advantageous to display in the background a geographical map.

ANNEX

Example OSPF Frame:

---

Frame 1 (474 bytes on wire, 474 bytes captured)
    Arrival Time: Mar 14, 2003 12:39:58.542566000
    Time delta from previous packet: 0.000000000 seconds
    Time relative to first packet: 0.000000000 seconds
    Frame Number: 1

-continued

```
        Packet Length: 474 bytes
        Capture Length: 474 bytes
Ethernet II, Src: 00:01:af:03:fc:d9, Dst: 00:03:ba:08:0f:d0
        Destination: 00:03:ba:08:0f:d0 (00:03:ba:08:0f:d0)
        Source: 00:01:af:03:fc:d9 (00:01:af:03:fc:d9)
        Type: IP (0x0800)
Internet Protocol, Src Addr: 10.0.9.2 (10.0.9.2), Dst Addr: 10.0.1.1 (10.0.1.1)
        Version: 4
        Header length: 20 bytes
        Differentiated Services Field: 0x00 (DSCP 0x00: Default; ECN: 0x00)
                0000 00.. = Differentiated Services Codepoint: Default (0x00)
                ......0. = ECN-Capable Transport (ECT): 0
                .......0 = ECN-CE: 0
        Total Length: 460
        Identification: 0x410a
        Flags: 0x00
                .0.. = Don't fragment: Not set
                ..0. = More fragments: Not set
        Fragment offset: 0
        Time to live: 64
        Protocol: OSPF (0x59)
        Header checksum: 0x19cd (correct)
        Source: 10.0.9.2 (10.0.9.2)
        Destination: 10.0.1.1 (10.0.1.1)
Open Shortest Path First
        OSPF Header
                OSPF Version: 2
                Message Type: LS Update (4)
                Packet Length: 440
                Source OSPF Router: 10.0.9.2 (10.0.9.2)
                Area ID: 0.0.0.0 (Backbone)
                Packet Checksum: 0x9f7c (correct)
                Auth Type: Null
                Auth Data (none)
        LS Update Packet
                Number of LSAs: 5
                LS Type: Opaque LSA, Area-local scope
                        LS Age: 2 seconds
                        Options: 0x62 (E/DC/O)
                        Link-State Advertisement Type: Opaque LSA, Area-local scope (10)
                        Link State ID Opaque Type: Traffic Engineering LSA (1)
                        Link State ID TE-LSA Reserved: 0
                        Link State ID TE-LSA Instance: 35
                        Advertising Router: 10.0.10.1 (10.0.10.1)
                        LS Sequence Number: 0x80000002
                        LS Checksum: cbae
                        Length: 96
                        MPLS Traffic Engineering LSA
                                Link Information
                                        TLV Type: 2 - Link Information
                                        TLV Length: 72
                                        Link Type: 1
                                                TLV Type: 1: Link Type
                                                TLV Length: 1
                                                Link Type: 1
                                        Link ID: 0.0.0.0 (0)
                                                TLV Type: 2: Link ID
                                                TLV Length: 4
                                                MPLS/TE Link ID: 0.0.0.0 (0.0.0.0)
                                        Traffic Engineering Metric: 1
                                                TLV Type: 5: Traffic Engineering Metric
                                                TLV Length: 4
                                                Traffic Engineering Metric: 1
                                        Resource Class/Color: 0
                                                TLV Type: 9: Resource Class/Color
                                                TLV Length: 4
                                                Resource Class/Color: 0
                                        Link Local and Remote Identifier: 167774721 (0xa000a01)
                                                TLV Type: 11: Link Local and Remote Identifier
                                                TLV Length: 8
                                                MPLS/TE Local Interface Index: 167774721
                                                MPLS/TE Remote Interface Index: 167774724
                                        Link Node Local Identifier: 10.0.10.4 (0xa000a04)
                                                TLV Type: 32773: Link Node Local Identifier
                                                TLV Length: 4
                                                MPLS/TE Local Node Index: 10.0.10.4 (10.0.10.4)
                                        Link Node Remote Identifier: 10.0.10.1 (0xa000a01)
                                                TLV Type: 32774: Link Node Remote Identifier
                                                TLV Length: 4
```

-continued

```
                    MPLS/TE Remote Node Index: 10.0.10.1 (10.0.10.1)
                Link Switching Capability Descriptor
                    TLV Type: 32775: Link Switching Capability Descriptor
                    TLV Length: 8
                    Switching Capability (100 TDM): 100
                    Encoding (5 for Sonet/SDH): 5
                    Signal Type: STS-48c/VC-4-16c
                    Number of Unallocated Timeslots: 1
LS Type: Opaque LSA, Area-local scope
    LS Age: 2 seconds
    Options: 0x62 (E/DC/O)
    Link-State Advertisement Type: Opaque LSA, Area-local scope (10)
    Link State ID Opaque Type: Traffic Engineering LSA (1)
    Link State ID TE-LSA Reserved: 0
    Link State ID TE-LSA Instance: 33
    Advertising Router: 10.0.10.1 (10.0.10.1)
    LS Sequence Number: 0x80000002
    LS Checksum: e87b
    Length: 96
    MPLS Traffic Engineering LSA
        Link Information
            TLV Type: 2 - Link Information
            TLV Length: 72
            Link Type: 1
                TLV Type: 1: Link Type
                TLV Length: 1
                Link Type: 1
            Link ID: 10.0.8.51 (a000833)
                TLV Type: 2: Link ID
                TLV Length: 4
                MPLS/TE Link ID: 10.0.8.51 (10.0.8.51)
            Traffic Engineering Metric: 10
                TLV Type: 5: Traffic Engineering Metric
                TLV Length: 4
                Traffic Engineering Metric: 10
            Resource Class/Color: 0
                TLV Type: 9: Resource Class/Color
                TLV Length: 4
                Resource Class/Color: 0
            Link Local and Remote Identifier: 92307457 (0x5808001)
                TLV Type: 11: Link Local and Remote Identifier
                TLV Length: 8
                MPLS/TE Local Interface Index: 92307457
                MPLS/TE Remote Interface Index: 80006
            Link Node Local Identifier: 10.0.10.4 (0xa000a04)
                TLV Type: 32773: Link Node Local Identifier
                TLV Length: 4
                MPLS/TE Local Node Index: 10.0.10.4 (10.0.10.4)
            Link Node Remote Identifier: 10.0.8.51 (0xa000833)
                TLV Type: 32774: Link Node Remote Identifier
                TLV Length: 4
                MPLS/TE Remote Node Index: 10.0.8.51 (10.0.8.51)
            Link Switching Capability Descriptor
                TLV Type: 32775: Link Switching Capability Descriptor
                TLV Length: 8
                Switching Capability (100 TDM): 100
                Encoding (5 for Sonet/SDH): 5
                Signal Type: STS-48c/VC-4-16c
                Number of Unallocated Timeslots: 1
LS Type: Opaque LSA, Area-local scope
    LS Age: 2 seconds
    Options: 0x62 (E/DC/O)
    Link-State Advertisement Type: Opaque LSA, Area-local scope (10)
    Link State ID Opaque Type: Traffic Engineering LSA (1)
    Link State ID TE-LSA Reserved: 0
    Link State ID TE-LSA Instance: 27
    Advertising Router: 10.0.10.1 (10.0.10.1)
    LS Sequence Number: 0x80000002
    LS Checksum: afd4
    Length: 96
    MPLS Traffic Engineering LSA
        Link Information
            TLV Type: 2 - Link Information
            TLV Length: 72
            Link Type: 1
                TLV Type: 1: Link Type
                TLV Length: 1
                Link Type: 1
            Link ID: 0.0.0.0 (0)
```

-continued

```
                TLV Type: 2: Link ID
                TLV Length: 4
                MPLS/TE Link ID: 0.0.0.0 (0.0.0.0)
            Traffic Engineering Metric: 1
                TLV Type: 5: Traffic Engineering Metric
                TLV Length: 4
                Traffic Engineering Metric: 1
            Resource Class/Color: 0
                TLV Type: 9: Resource Class/Color
                TLV Length: 4
                Resource Class/Color: 0
            Link Local and Remote Identifier: 167774721 (0xa000a01)
                TLV Type: 11: Link Local and Remote Identifier
                TLV Length: 8
                MPLS/TE Local Interface Index: 167774721
                MPLS/TE Remote Interface Index: 167774723
            Link Node Local Identifier: 10.0.10.3 (0xa000a03)
                TLV Type: 32773: Link Node Local Identifier
                TLV Length: 4
                MPLS/TE Local Node Index: 10.0.10.3 (10.0.10.3)
            Link Node Remote Identifier: 10.0.10.1 (0xa000a01)
                TLV Type: 32774: Link Node Remote Identifier
                TLV Length: 4
                MPLS/TE Remote Node Index: 10.0.10.1 (10.0.10.1)
            Link Switching Capability Descriptor
                TLV Type: 32775: Link Switching Capability Descriptor
                TLV Length: 8
                Switching Capability (100 TDM): 100
                Encoding (5 for Sonet/SDH): 5
                Signal Type: STS-48c/VC-4-16c
                Number of Unallocated Timeslots: 1
LS Type: Opaque LSA, Area-local scope
    LS Age: 2 seconds
    Options: 0x62 (E/DC/O)
    Link-State Advertisement Type: Opaque LSA, Area-local scope (10)
    Link State ID Opaque Type: Traffic Engineering LSA (1)
    Link State ID TE-LSA Reserved: 0
    Link State ID TE-LSA Instance: 25
    Advertising Router: 10.0.10.1 (10.0.10.1)
    LS Sequence Number: 0x80000002
    LS Checksum: aee2
    Length: 96
    MPLS Traffic Engineering LSA
        Link Information
            TLV Type: 2 - Link Information
            TLV Length: 72
            Link Type: 1
                TLV Type: 1: Link Type
                TLV Length: 1
                Link Type: 1
            Link ID: 10.0.5.1 (a000501)
                TLV Type: 2: Link ID
                TLV Length: 4
                MPLS/TE Link ID: 10.0.5.1 (10.0.5.1)
            Traffic Engineering Metric: 10
                TLV Type: 5: Traffic Engineering Metric
                TLV Length: 4
                Traffic Engineering Metric: 10
            Resource Class/Color: 0
                TLV Type: 9: Resource Class/Color
                TLV Length: 4
                Resource Class/Color: 0
            Link Local and Remote Identifier: 92307457 (0x5808001)
                TLV Type: 11: Link Local and Remote Identifier
                TLV Length: 8
                MPLS/TE Local Interface Index: 92307457
                MPLS/TE Remote Interface Index: 6
            Link Node Local Identifier: 10.0.10.3 (0xa000a03)
                TLV Type: 32773: Link Node Local Identifier
                TLV Length: 4
                MPLS/TE Local Node Index: 10.0.10.3 (10.0.10.3)
            Link Node Remote Identifier: 10.0.5.1 (0xa000501)
                TLV Type: 32774: Link Node Remote Identifier
                TLV Length: 4
                MPLS/TE Remote Node Index: 10.0.5.1 (10.0.5.1)
            Link Switching Capability Descriptor
                TLV Type: 32775: Link Switching Capability Descriptor
                TLV Length: 8
                Switching Capability (100 TDM): 100
```

```
            Encoding (5 for Sonet/SDH): 5
            Signal Type: STS-48c/VC-4-16c
            Number of Unallocated Timeslots: 1
    LS Type: Opaque LSA, Area-local scope
        LS Age: 2 seconds
        Options: 0x62 (E/DC/O)
        Link-State Advertisement Type: Opaque LSA, Area-local scope (10)
        Link State ID Opaque Type: Traffic Engineering LSA (1)
        Link State ID TE-LSA Reserved: 0
        Link State ID TE-LSA Instance: 61
        Advertising Router: 10.0.10.1 (10.0.10.1)
        LS Sequence Number: 0x80000002
        LS Checksum: 1077
        Length: 28
        MPLS Traffic Engineering LSA
            Router Address: 10.0.10.1
                TLV Type: 1 - Router Address
                TLV Length: 4
                MPLS/TE Router ID: 10.0.10.1 (10.0.10.1)
```

What is claimed is:

1. A network monitor connected to a first dedicated packet-switched data network for passively monitoring traffic on the first dedicated packet-switched data network to filter protocol frames in the first dedicated packet-switched data network in order to extract information about a network topology and status of a second automatically switched optical transport network, the first dedicated packet-switched data network connecting network controllers controlling associated network elements of the second automatically switched optical transport network, said network monitor comprising:

a module to filter protocol frames of a predefined protocol type in the first dedicated packet-switched data network by which said network controllers advertise a network topology and status of the second automatically switched optical transport network; and a module to extract from the filtered protocol frames transmitted in the first dedicated packet-switched data network information about the network topology and status of the second automatically switched optical transport network and display the network topology and status information of the automatically switched optical transport network graphically to a user, wherein the module to filter protocol frames and the module to extract from the filtered protocol frames information about the network topology are elements of the network monitor independent from and not integrated into the network controllers controlling the associated network elements.

2. A network monitor according to claim 1, comprising a sniffer module configured to capture data from a data network connection in the first dedicated packet-switched data network, or read data from a previously captured file and to pass said data to an evaluation module programmed to extract said topology and status information of the second automatically switched optical transport network from the data and to display the network topology and status information of the second automatically switched optical transport network graphically on a display.

3. A network monitor according to claim 1, wherein said frames of a predefined protocol type are OSPF frames comprising information about routing controllers, border nodes of domains and links to and from the border nodes.

4. A network monitor according to claim 1, wherein said network monitor is further configured to represent domains as indicated by their corresponding routing controllers as smaller circles along a circle line of a larger circle.

5. A network monitor according to claim 1, wherein said network monitor is further configured to represent links with idle capacity in a first color and busy links in a second color.

6. A network monitor according to claim 1, further comprising a command line interface connected to one of the network controllers to program said connected network controller to broadcast a request for an immediate update of topology and status information and/or to program said connected network controller to set up a new connection and/or perform other configuration changes in the second automatically switched optical transport network.

7. A network monitor according to claim 1, wherein said network monitor is further configured to detect a mismatch between any two filtered protocol frames and display these frames as ASCII text to a user.

8. A method of passively monitoring traffic on a first dedicated packet-switched data network to filter protocol frames in the first dedicated packet-switched data network in order to extract information about a network topology and status of a second automatically switched optical transport network, the first dedicated packet-switched data network connecting network controllers controlling associated network elements of the second automatically switched optical transport network; said method comprising the steps of:

filtering protocol frames of a predefined protocol type in the first dedicated packet-switched data network, by a network monitor, by which said network controllers advertise a network topology and status of the second automatically switched optical transport network;

extracting from the filtered protocol frames transmitted in the first dedicated packet-switched data network, by the network monitor, information about the network topology and status of the second automatically switched optical transport network and displaying the network topology and status information of the second automatically switched optical transport network graphically to a user, wherein the steps of filtering, extracting and displaying are performed independently from the controlling of the associated network elements and the advertising of the network topology and the status by the network controllers.

* * * * *

UNITED STATES PATENT AND TRADEMARK OFFICE
CERTIFICATE OF CORRECTION

PATENT NO. : 7,630,322 B2
APPLICATION NO. : 10/785098
DATED : December 8, 2009
INVENTOR(S) : Thomas Mohr Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1050 days.

Signed and Sealed this

Twenty-first Day of December, 2010

David J. Kappos
*Director of the United States Patent and Trademark Office*